United States Patent [19]

Wurst et al.

[11] Patent Number: 5,058,830
[45] Date of Patent: Oct. 22, 1991

[54] ESCAPE MECHANISM FOR CREW OF AIRCRAFT

[75] Inventors: Stephen G. Wurst, Orange; Harry A. Scott, Hawthorne, both of Calif.

[73] Assignee: Rockwell International Corporation, El Segundo, Calif.

[21] Appl. No.: 476,849

[22] Filed: Feb. 8, 1990

[51] Int. Cl.⁵ .............................................. B64C 1/00
[52] U.S. Cl. .................................. 244/140; 244/117 A
[58] Field of Search ............... 102/377, 378; 244/120, 244/139, 140, 141, 117 A, 135 R

[56] References Cited

U.S. PATENT DOCUMENTS

| | | | |
|---|---|---|---|
| 2,736,523 | 2/1956 | Chaplin | 244/140 |
| 2,977,080 | 3/1961 | Von Zborowski | 244/140 |
| 3,067,973 | 12/1962 | Halsey et al. | 244/140 |
| 3,129,667 | 4/1964 | Wen | 244/117 A |
| 3,369,782 | 2/1968 | Billig et al. | 244/117 A |
| 3,703,265 | 11/1972 | Troitino | 244/120 |
| 3,881,671 | 5/1975 | Bouchnik | 244/140 |
| 3,979,005 | 9/1976 | Robinson et al. | 244/135 R |
| 4,580,746 | 4/1986 | Peck | 244/140 |

FOREIGN PATENT DOCUMENTS

| | | | |
|---|---|---|---|
| 3534719 | 4/1987 | Fed. Rep. of Germany | 244/121 |
| 1022635 | 3/1966 | United Kingdom | 102/378 |

Primary Examiner—Joseph F. Peters, Jr.
Assistant Examiner—Linda L. Palomar
Attorney, Agent, or Firm—Charles T. Silberberg; Max Geldin

[57] ABSTRACT

A crew protection system designed to isolate an aircraft crew and provide a means for safely evacuating an aircraft, particularly hypersonic vehicles, in emergency situations. The crew compartment is designed within the forebody of the main vehicle. The forebody is designed so as to separate cleanly from the main vehicle as by generation of a circumferential structural break, in the event of a catastrophic failure or explosion of the main vehicle fuel tank. In the event of such an uncommanded failure of the main tank and propellant combustion, resulting in the above noted structural failure, the resultant pressure impulse thrusts the forebody containing the crew compartment clear from the remainder of the vehicle. The provision of a system of baffles in the forebody between the crew compartment and the fuel tank, and the shape of the forebody and the materials used in its construction mitigate the effects of the blast pressure impulse on the crew. The forebody is also designed to be stable during the transient period immediately following the blast and the subsequent free fall of the forebody, permitting the crew to safely evacuate the crew compartment and forebody at a preselected altitude.

12 Claims, 2 Drawing Sheets

ESCAPE MECHANISM FOR CREW OF AIRCRAFT

BACKGROUND OF THE INVENTION

This invention relates to an aircraft protection system, and is particularly concerned with a crew protection system for safely evacuating aircraft, especially hypersonic vehicles, in emergency situations, e.g. in the event of an uncommanded failure or explosion of the main fuel tank.

The prior art to date has failed to address the problem of protecting the crew of an aircraft from the effects of a sudden overpressure created by a catastrophic failure of the main vehicle fuel or propellant tank. The prior art deals mainly with commanded or dedicated systems for removing the crew compartment from the remainder of an aircraft vehicle in an emergency, but fails to deal with means to activate or initiate crew member escape systems due to the uncommanded catastrophic failure of the vehicle resulting from a propellant tank explosion. Further, existing crew protection concepts impose unacceptable weight penalties and are not cost efficient.

U.S. Pat. No. 4,580,746 discloses a capsule and rocket extraction system for providing an inflight escape system for the pilot of a damaged aircraft, comprising means for sequentially actuating a capsule extraction device to separate the capsule from the main fuselage and then actuating a rocket for extracting the pilot from the capsule.

Other exemplary prior art showing various forms of crew escape mechanisms for aircraft include U.S. Pat. Nos. 3,703,265; 3,377,037; 3,374,965; 2,941,764; 3,067,973 and 2,977,080.

Each of the above patented escape systems specifies a propulsion unit for crew compartment separation. Generally, the prior art deals with dedicated extraction systems such as dedicated rockets to activate crew member escape systems.

It is accordingly an object of the present invention to provide an escape system for crew protection of an aircraft, particularly a hypersonic vehicle, under catastrophic conditions of the vehicle.

Another object is the provision of a crew protection system for aircraft in the event of an uncommanded catastrophic failure or explosion of the main fuel tank.

A still further object is the provision of means to permit crew members to escape from aerospace vehicles, by permitting the crew-containing capsule to be thrust clear from the remainder of the vehicle, in an emergency situation resulting from an uncommanded failure or detonation of the main fuel tank, thereby providing a weight savings over prior art methods of crew protection, such as the use of dedicated rockets, particularly at hypersonic speeds.

Other objects and advantages of the invention will become apparent from the following description of the invention.

SUMMARY OF THE INVENTION

The crew protection system of the invention is designed to isolate the crew of the aircraft from hazards particularly catastrophic failure of the fuel tank, and provides a means for safely evacuating hypersonic vehicles in such emergency situations. The crew compartment is positioned within a forebody of the main vehicle. The forebody is designed so as to separate cleanly from the main vehicle in the event of catastrophic failure of the main vehicle fuel tank, as by combustion of propellants, protecting the crew members throughout such hazardous situation. The forebody separation system will generate a simultaneous substantially circumferential structural break during a catastrophic tank explosion. This system will allow the energy released by such fuel tank failure to separate the forebody from the parent vehicle without any lagging structural detachments. This will assure that the forebody separates from the parent vehicle without inducing any undesirable pitching or yawing moments.

Thus, in the event of an uncommanded failure of the main tank, propellant combustion and the resultant pressure impulse, thrusts the forebody clear from the remainder of the vehicle. The forebody is designed to withstand the worst case, uncommanded, failure modes. As an additional feature, it is also possible to initiate separation of the forebody from the main vehicle by causing a controlled failure of the main tank.

The invention system is unique in that it protects the crew members during situations where there is insufficient lead time to initiate escape. In addition, since separation of the forebody from the main vehicle does not require a dedicated rocket motor for separation, a considerable weight savings is gained, and the invention system is thus cost efficient.

The shape and physical characteristics of the forebody and the materials used in its construction mitigate the effects of the blast pressure impulse. In addition, the forebody protects the crew members from both the heat of the blast and the aerodynamic heating experienced during the subsequent ballistic trajectory. The forebody is designed to be stable during both the transient period immediately following the blast and the subsequent freefall conditions. In the event of a high altitude/high speed escape situation, the crew members would ride down in the forebody to a lower altitude. At a preselected altitude and terminal velocity, the crew could then evacuate the forebody using a conventional ejection seat.

DETAILED DESCRIPTION OF THE INVENTION AND PREFERRED EMBODIMENTS

The forebody separation concept of the invention employs a tank blast overpressure to separate and propel the forebody from the main vehicle. The separation device employs predictable failure of the primary structure to cleanly cut the fuselage and separate the forebody.

Figure 1:
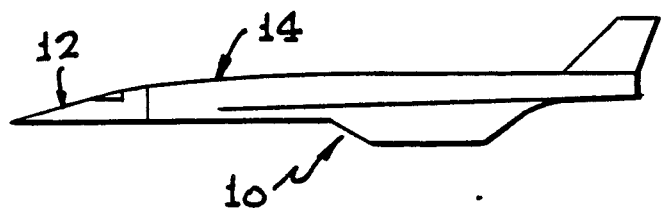
FIG. 1 illustrates a hypersonic aircraft having a separable forebody capsule according to the invention.

Referring to FIG. 1 of the drawing, numeral 10 represents a hypersonic aircraft having a forebody or forebody capsule 12 and an aft fuselage 14.

Figure 2:
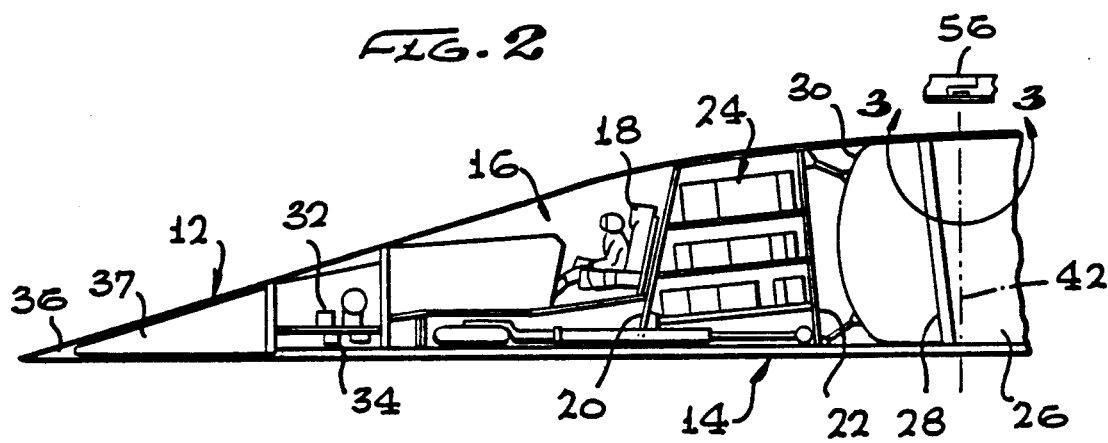
FIG. 2 is a detailed horizontal section of the separable forebody of the aircraft of FIG. 1.

Referring to FIG. 2 of the drawing, the forebody 12 contains a crew compartment 16 having an ejection seat 18 of conventional design. The forebody consists of a blastworthy structure to provide. protection from a catastrophic structural failure resulting from a fuel tank explosion. Thus, baffles including a crew compartment pressure bulkhead 20 and an aft pressure bulkhead 22 are provided, with an avionics bay 24 located between the bulkheads and aft of the crew compartment 16. A fuel or propellant tank 26 is located in the fuselage 14, just aft of the forebody 12. The fuel tank 26 contains baffles such as 28 and an end cap 30 just aft of the avionics bay pressure bulkhead 22. The baffles such as 28 within the main fuel tank 26, the end cap 30 on the fuel tank, and the forebody bulkheads 20 and 22, are designed to protect the crew member from the hazards of a main tank failure.

An attitude control system 32 is provided in the forebody 12 to afford a very rapid means of stabilizing the forebody once activated during escape following forebody separation. Environmental control and life support system 34 is also provided. Thermodynamic heating of the forebody vehicle limits the performance envelope of the forebody for escape, unless provisions are made for cooling. For this purpose, e.g. for high performance cooling, an active cooling system indicated at 37, is provided in the nose 36 of the forebody. The ejection seat 18 provides a means of evacuating the forebody in the event of low altitude, low speed escape situations and can also be used to evacuate the crew compartment and forebody after separation thereof from the main vehicle, following a catastrophic fuel tank explosion.

Figure 3:
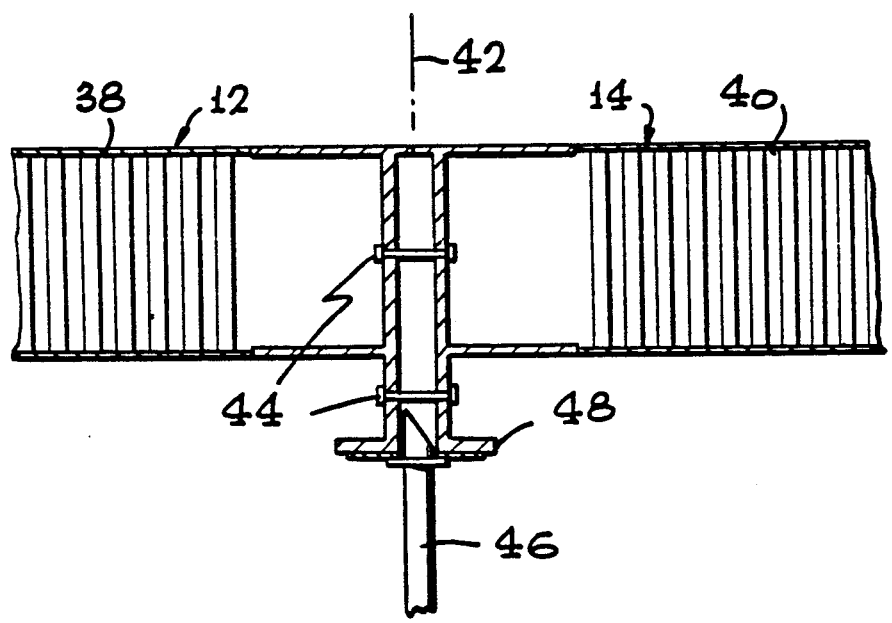
FIG. 3 is an enlarged section taken around line 3—3 of FIG. 2 showing a passive separation system for separation of the forebody from the main fuselage of the aircraft upon a sudden increase of pressure as by explosion of the main fuel tank of the aircraft.

Referring to FIG. 3, there is shown one embodiment of a completely passive separation system of the invention which would allow the forebody to separate from the parent vehicle by relying entirely on blast overpressures to provide a clean structural break. Numerals 38 and 40 illustrate the primary structural members between the forebody 12 and main fuselage 14, just aft of the fuel tank end cap 30. The primary structural members 38 and 40 are connected together at their separation plane 42 by a plurality, here shown as two, joint fasteners 44. A joint guillotine 46 is provided on a support member 48, the guillotine 46 being connected to a pressure sensing mechanism (not shown) which activates the guillotine to sever the structural fasteners 44, upon the application of a predetermined overpressure such as that from a catastrophic fuel tank explosion, which is sensed by the pressure sensing mechanism, severing the structural fasteners 44, and separating the primary structure members 38 and 40 and the associated forebody 12 and fuselage 14, along the separation plane 42. A plurality of the guillotine type separation systems illustrated in FIG. 3 are provided in equally spaced relation peripherally around the separation plane 42, for simultaneous activation to generate a simultaneous circumferential structural break on the separation plane 42 during a catastrophic tank explosion. This system will allow the forebody to separate from the parent vehicle fuselage 14 without any lagging structural detachments. This will assure that the forebody separates from the parent vehicle without inducing any undesirable pitching or yawing moments. This type of structural break thus provides a "clean" separation of the forebody from the main fuselage.

Another means of detaching the forebody during a catastrophic explosion without relying on crew response can utilize a pressure sensing device which would activate pyrotechnic devices or other systems to provide a clean structural break between the forebody and the main fuselage.

Figure 4:
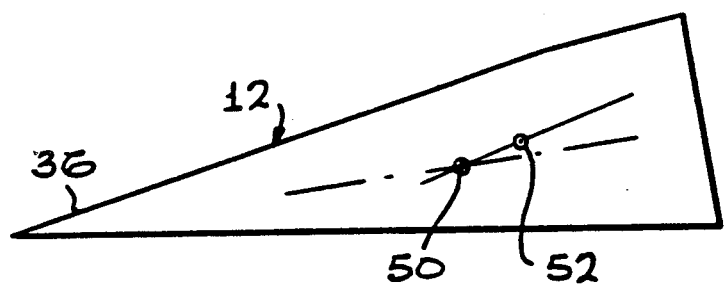
FIG. 4 illustrates preferred location of the center of gravity and center of pressure of the forebody to provide stability thereof during separation and descent.

Referring to FIG. 4, the aerodynamic or streamlined shape of the forebody 12 and control of the location of the forebody center of gravity are important to provide stability and control of the forebody, after separation from the main fuselage. The inherent characteristics of a hypersonic forebody combined with a center of gravity at 50 preferably located at approximately 65% of the length of the forebody from the nose 36, together with the location of the center of pressure 52 aft of the center of gravity and with a slight vertical offset between the center of gravity and the center of pressure, provide stability of the forebody during separation and descent. Roll control and attitude stabilization is provided by the attitude control system (ACS) 32. An additional stability device for the forebody can also be employed if desired, such as a deployable forebody flap or a drogue chute.

Figure 5:
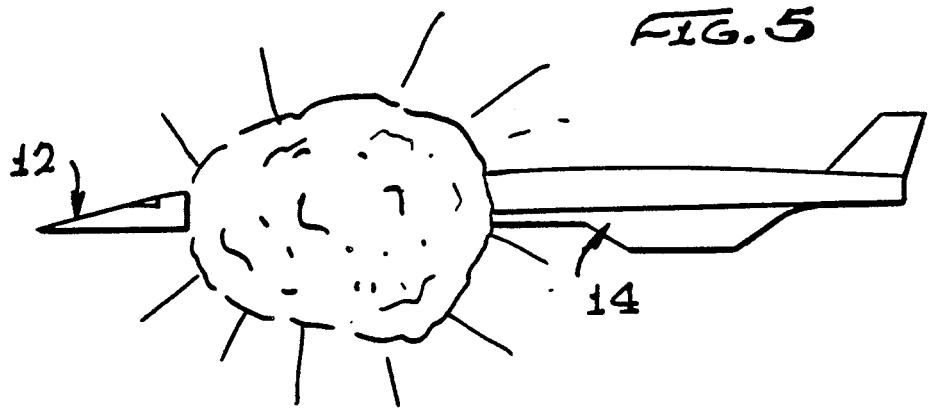
FIG. 5 illustrates a catastrophic explosion of the fuel tank of the hypersonic aircraft of FIG. 1.

If there is a catastrophic failure of the main vehicle precipitated by detonation or combustion of the propellant, e.g. liquid hydrazine, within the fuel tank 26, with either ambient air or with the onboard oxidizer, the resultant pressure pulse would propagate rapidly, giving little or no warning prior to the structural failure of the tank. This would then result in the uncommanded separation of the forebody 12 and the crew compartment therein, from the main fuselage 14. Such pressure pulse sensed by the pressure sensing mechanism will activate the joint guillotine 46 and sever the structural fasteners 44, resulting in a clean circumferential structural break along the separation plane 42 and an instantaneous separation of the forebody 12 from the main fuselage 14 as illustrated in FIG. 5 of the drawing. Since insufficient time exists to react during such a failure, protection must be in place and operational prior to the event. The baffles such as 28 within the fuel tank 26, the tank end cap 30 and bulkheads 20 and 22 within the forebody 12, are designed to mitigate the blast associated with the combustion of the onboard propellant to prevent the acceleration of the crew member from exceeding human limitations.

Figure 6:
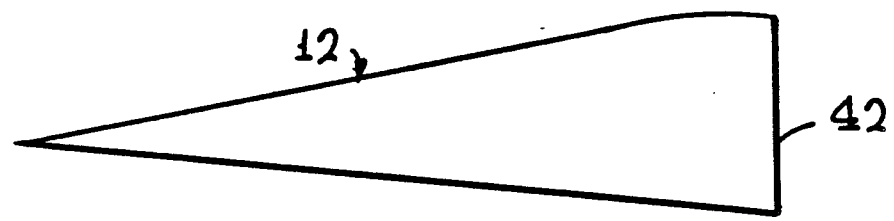
FIG. 6 illustrates acceleration of the forebody away from the fuselage of the aircraft following the separation explosion in FIG. 5.

Referring to FIG. 6, showing the separated forebody 12 following the explosion illustrated in FIG. 5, it will be noted that the separation from the main fuselage 14 has taken place along the separation plane 42, providing a "clean" break of the forebody away from the fuselage.

Figure 7:
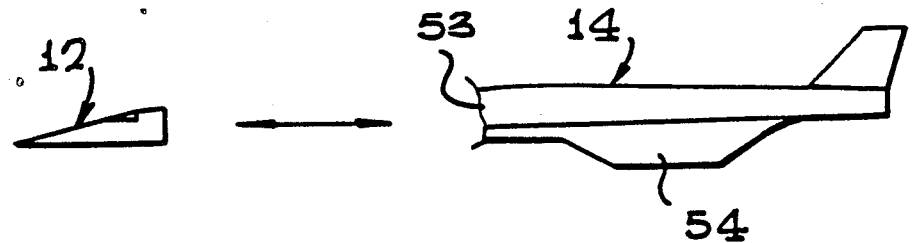
FIG. 7 illustrates the forebody following forebody separation, propelling the crew capsule contained within the forebody away from the exploding aft body section.

Now referring to FIG. 7, illustrating the positions of the forebody 12 and fuselage 14 immediately following separation, once the pressure impulse thrusts the forebody 12 clear of the remainder of the vehicle 14, the relative separation continues to increase due to aerodynamic forces. The forebody is streamlined to have a higher ballistic coefficient than the remainder of the vehicle once the forebody has separated. The remainder of the vehicle 14 then decelerates at a more rapid rate than does the forebody. The open end 53 of the fuselage 14, as shown in FIG. 7, greatly increases drag, and the engine (shut down after the explosion) plus drag pitches the vehicle and aids separation. The wing 54 adds lift and drag until it fails. Control of the forebody 12 during descent can be implemented through the use of the attitude control system 32 and careful design of the forebody center of gravity 50 with respect to the center of pressure 52. By incorporating a slight vertical offset between the center of gravity and center of pressure in the forebody, as previously noted, the forebody can be stabilized at a slight angle of attack without the necessity of specialized deployable surfaces. Small nose jets (not shown) in the nose 36 of the forebody aid in descending to a safe ejection flight regime. Thus, immediately following separation, the forebody 12 begins rapidly to decelerate, and the forebody free falls to a lower altitude and slows to a velocity permitting safe ejection of the crew member from the crew compartment by means of the ejection seat 18.

Optionally, additional means can be provided to cause a controlled failure of the fuel tank, and to initiate or aid in separation of the forebody and crew compartment from the main vehicle. Thus, viewing FIG. 2, a shaped charge 56 can optionally be provided externally on vehicle 10 adjacent the separation plane 42. Accelerometers and strain gauges throughout the vehicle continuously monitor pitch and roll rates and the status of the vehicle structure. If it has been determined that a catastrophic vehicle failure is imminent or has occurred, the escape system of the invention is activated by actuation of the charge 56 from the crew compartment, causing a controlled detonation of the propellant in tank 26, ensuring a clean severance and a positive separation between the forebody and the remainder of the fuselage along a substantially circumferential structural break therebetween. If detonation in the tank 26 has previously occurred, the separation charge serves to clean off the aft end of the forebody.

From the foregoing, it is seen that the present invention provides a simple and practical means for crew members to escape from aerospace vehicles travelling at varying speeds, in the event of an uncommanded failure of the main fuel tank by propellant combustion or explosion, and provides a weight savings over prior art proposed methods of crew protection utilizing commanded systems such as rockets for separating crew member capsules from the main vehicle.

Since various modifications of the invention will occur to those skilled in the art, the invention is not to be taken as limited except by the scope of the appended claims.

What is claimed is:

1. In an aerospace vehicle comprised of a main vehicle having a fuel tank adapted to contain a fuel and a forebody coupled to said main vehicle, said forebody containing a crew compartment; a crew protection system in the event of a catastrophic failure of said fuel tank by combustion of fuel therein, which comprises
a system of baffles within the aft end of the forebody between the crew compartment and the fuel tank, to protect a crew member and cushion the blast of a fuel tank failure, and
means provided on said aerospace vehicle between said main vehicle and said forebody, whereby in the event of an uncommanded catastrophic failure of said fuel tank, a substantially circumferential structural break occurs between said forebody and said main vehicle, separating said forebody and crew compartment from said main vehicle.

2. The aerospace vehicle of claim 1, said forebody being shaped and constructed to ensure that the blast wave associated with said catastrophic fuel tank failure propels the forebody away from the remaining main vehicle to enable subsequent escape of the crew from said crew compartment.

3. The aerospace vehicle of claim 1, and including an end cap on said fuel tank adjacent the aft end of said forebody and said system of baffles therein, and baffle means in said fuel tank.

4. The aerospace vehicle of claim 1, said forebody being streamlined, and having a nose at its forward end and a center of gravity at a location about 65% of the length of the forebody from the nose thereof, and a center of pressure behind said center of gravity and slightly vertically offset from said center of gravity for stabilizing said forebody after separation thereof from said main vehicle.

5. The aerospace vehicle of claim 1, and including an altitude control means for rapidly stabilizing the forebody after separation thereof from the main vehicle.

6. The aerospace vehicle of claim 1, including an ejection seat in said crew compartment operable for selectively evacuating a crew member from said crew compartment after separation of said forebody from said main vehicle.

7. The aerospace vehicle of claim 12, said means to cause a controlled failure of said fuel tank comprising an explosive charge on said main vehicle capable of selective activation from said crew compartment to cause detonation of the fuel in said fuel tank, and separation of said forebody from the main vehicle along said substantially circumferential structural break.

8. The aerospace vehicle of claim 11, and including an end cap on said fuel tank adjacent the aft end of said forebody and said system of baffles therein, and baffle means in said fuel tank.

9. The aerospace vehicle of claim 1, said forebody being streamlined, and having a nose at its forward end and a center of gravity at a location about 65% of the length of the forebody from the nose thereof, and a center of pressure behind said center of gravity and slightly vertically offset from said center of gravity, and including an attitude control means for stabilizing said forebody after separation thereof from said main vehicle.

10. The aerospace vehicle of claim 8, said forebody being streamlined, and having a nose at its forward end and a center of gravity at a location about 65% of the length of the forebody from the nose thereof, and a center of pressure behind said center of gravity and slightly vertically offset from said center of gravity, and including an attitude control means for stabilizing said forebody after separation thereof from said main vehicle 11. In an aerospace vehicle comprised of a main vehicle having a fuel tank adapted to contain a fuel and a forebody coupled to said main vehicle, said forebody containing a crew compartment; a crew protection system in the event of a catastrophic failure of said fuel tank by combustion of fuel therein, which comprsies
primary structural members on said main vehicle and said forebody, a system of baffles within the aft end of the forebody between the crew compartment and the fuel tank, to protect a crew member and cushion the blast of a fuel tank failure, said means comprising a plurality of fasteners between adjacent primary structural members of said main vehicle and said forebody, means capable of severing said fasteners, and means activating said severing means in response to a blast pressure resulting from said catastrophic failure of said fuel tank.

12. In an aerospace vehicle comprised of a main vehicle having a fuel tank adapted to contain a fuel and a forebody coupled to said main vehicle, said forebody containing a crew compartment; a crew protection system in the event of a catastrophic failure of said fuel tank by combustion of fuel therein, which comprises a system of baffles within the aft end of the forebody between the crew compartment and the fuel tank, to protect a crew member and cushion the blast of a fuel tank failure, means provided on said aerospace vehicle between said main vehicle and said forebody, whereby in the event of an uncommanded catastrophic failure of said fuel tank, a substantially circumferential structural break occurs between said forebody and said main vehicles, separating said forebody and crew compartment from said main vehicle, and means to cause a controlled failure of said fuel tank, to initiate or aid in said separation of said forebody and said crew compartment from said main vehicle.

* * * * *